United States Patent [19]

Nagaoka

[11] Patent Number: 4,974,559
[45] Date of Patent: Dec. 4, 1990

[54] COMBUSTION SYSTEM AND COMBUSTION APPARATUS FOR INTERNAL COMBUSTION ENGINE

[75] Inventor: Tadashi Nagaoka, Nishinomiya, Japan

[73] Assignee: Hi-Tech International Laboratory Company, Limited, Nishinomiya, Japan

[21] Appl. No.: 305,124
[22] PCT Filed: Feb. 15, 1988
[86] PCT No.: PCT/JP88/00149
§ 371 Date: Sep. 19, 1988
§ 102(e) Date: Sep. 19, 1988
[87] PCT Pub. No.: WO88/06231
PCT Pub. Date: Aug. 25, 1988

[30] Foreign Application Priority Data

Feb. 19, 1987 [JP] Japan .................. 62-37594

[51] Int. Cl.⁵ .................. F02P 13/00; H01T 13/52
[52] U.S. Cl. .................. 123/169 PA; 123/169 PH; 123/298; 123/309; 313/143
[58] Field of Search .................. 123/169 PA, 169 PH, 123/169 EL, 298, 306, 309; 313/143

[56] References Cited

U.S. PATENT DOCUMENTS

| 1,929,748 | 10/1933 | Little .................. 313/143 |
| 3,056,899 | 10/1962 | Clayton .................. 313/143 |
| 4,146,004 | 3/1979 | Dubois .................. 123/169 PH |
| 4,245,589 | 1/1981 | Ryan .................. 123/298 |

FOREIGN PATENT DOCUMENTS

| 0126411 | 11/1978 | Japan .................. 123/169 EL |
| 54-2334 | 2/1979 | Japan . |
| 54-22605 | 2/1979 | Japan . |
| 55-142931 | 11/1980 | Japan . |
| 56-105621 | 8/1981 | Japan . |

Primary Examiner—Willis R. Wolfe
Attorney, Agent, or Firm—Armstrong, Nikaido, Marmelstein, Kubovcik & Murray

[57] ABSTRACT

A combustion apparatus and a combustion system for an internal combustion engine wherein a funnel-shaped cone with an orifice at the apex thereof is provided in a combustion chamber and spaced from an ignition apparatus so that as a gaseous, combustible mixture is introduced into the chamber, it flows through the cone to the orifice where it is ignited by the ignition apparatus so that the flame caused thereby explodes outwardly through ejection openings and along the external surface of the cone into the chamber so as to envelope the uncombusted gases and cause maximum explosion and combustion of the mixture automatically. The structure is applicable to existing conventional spark ignition engines when the cone is provided at the front end portion of the spark plug. For compression ignition engines, the cone is provided in a pre-combustion chamber in the cylinder head or is attached to the cylinder head and extends into a chamber provided in the piston. In continuous-flow internal combustion engines, the cone is provided within the combustion chamber, first combustion being made outside of the cone and subsequent combustion being made inside of the cone.

34 Claims, 6 Drawing Sheets

COMBUSTION SYSTEM AND COMBUSTION APPARATUS FOR INTERNAL COMBUSTION ENGINE

FIELD OF TECHNOLOGY

The present invention relates to a combustion system and a combustion apparatus for internal combustion engine.

BACKGROUND OF TECHNOLOGY

An internal combustion engine is commonly classified as a spark-ignition engine, a compression-ignition engine or a continuous-flow internal combustion engine. A typical spark-ignition engine is shown in FIG. 11.

The combustion in a conventional spark-ignition engine is as follows an admixture supplied from outside into the cylinder is compressed by the upward motion of the piston in a combustion chamber when the portion of this compressed admixture closest to the spark plug is ignited by the spark plug, a flame front propagates, like a ring in water, from the ignition point throughout the combustion chamber. Finally all of the admixture in the combustion chamber is burnt.

As described above, there are two prime phases, i.e. before-combustion admixture and after-combustion gas, which are divided clearly by the flame front, the flame front propagating like a ring in water from a particular portion. Such flame propagation is a characteristic of a spark-ignition engine.

Spark-ignition engines include not only the above mentioned means but also the type wherein there is direct fuel injection to the combustion chamber, as shown in FIG. 12, and the CVCC type shown in FIG. 13. The difference between those two types and the above mentioned type is as follows. The former produces an admixture in the combustion chamber by direct fuel supply to the combustion chamber from a fuel injection-valve, while in the latter type, a substantially homogeneous lean admixture is supplied to the combustion chamber and a rich admixture is supplied to a sub-combustion chamber disposed in the cylinder head. When the spark plug ignites rich admixture in the sub-combustion chamber, the flame and the combustion gas belch out from the sub-combustion chamber to the combustion chamber in order to combust the lean admixture in the combustion chamber. However, the process of flame front propagating from a particular portion and spreading combustion to all the admixture in the combustion chamber are the same as the first mentioned conventional type.

Conventional compression-ignition engines are classified in three types, i.e. direct-injection, pre-combustion-chamber and swirl-chamber types, as shown in FIGS. 14 to 16 respectively.

In the direct-injection type, where the fuel is injected directly into the combustion chamber from an injection-valve, the fuel self-ignites and burns by contact with the air in the combustion chamber which becomes hot and highly compressed by the upward motion of the piston.

The pre-combustion-chamber type has a main combustion chamber and a pre-combustion chamber of small volume which is connected with the main combustion chamber through a small diameter connecting-hole. First, a part of the fuel injected from the injection-valve to the pre-combustion chamber is burn. Then as the pressure increases in the pre-combustion-chamber, the fuel together with the combustion gas is ejected through the connecting-hole into the main combustion chamber and burns all the fuel therein.

The swirl-chamber type provides a nearly spherical swirl-chamber in the cylinder head, the fuel supplied by the injection valve into the swirl chamber is mixed rapidly with the air by the effects of the swirl and for the most part is burnt therein. High temperature gas is then ejected through the connecting-hole into the main combustion chamber and completes the combustion.

In recent years, an increase in power output, a decrease in the pollutants in exhaust gas, a decrease in the fuel consumption, and a decrease in noise are the most important factors in the design of internal combustion engines, and these are all related to the combustion systems.

However, the combustion systems explained above have the following problems.

Since a combustion principle in the spark-ignition engine depends on the flame propagation as explained, if the fuel content in the admixture is low, the admixture is not ignited or some uncombusted part remains. On the other hand, if the fuel content is high, not only do the pollutants in the exhaust gas, i.e. HC and CO content, increase, but the NOx content increases due to the high combustion temperature. Moreover, fuel consumption also increases. In order to solve these problems the above mentioned direct-fuel-injection type was attempted, but it has a problem of mixing the fuel with the air in the combustion chamber and hardly any practical use of it can be seen today.

Another problem of the combustion system depending on the flame propagation is slow combustion speed. Increasing speed by swirl in the cylinder is recommended but the thermal loss at the wall of the cylinder increases and creates another problem of reduction of thermal efficiency of the engine. In order to improve the thermal efficiency it is necessary to increase a cycle efficiency by using a higher compression ratio thereby completing the combustion as soon as possible after the upper dead point and increasing the constant-volume-ratio. However, high compression ratios generate knocking.

A spark plug, shown in FIG. 17, is an indispensable component for the spark-ignition engine. Some problems with existing spark plugs are ignition difficulty due to a lean admixture or due to turbulence intended to increase combustion speed, quenching effects by the electrode, insulation failure as a result of carbon deposit or fouling and wear of electrodes, etc., all of which form the basis for important requirements for the improvement of a combustion system in the spark-ignition engine. Therefore, various ideas for improvement of the spark plug have been proposed, for example in U.S. Pat. Nos. 1,929,748, 3,056,899 and 3,515,925.

A spark plug (A), from the specification of U.S. Pat. No. 1,929,748, is indicated in FIG. 18. Regarding spark plug (A), the combustion flame is ejected to the combustion chamber mainly in the direction of the axis of the spark plug (A) and the remaining combustion flame is ejected from passages spirally and causing a swirl, thereby promoting rapid and complete combustion of the admixture and providing an improved self cleaning effect on the spark plug itself.

Spark plug (B), from the specification of U.S. Pat. No. 3,056,899, is indicated in FIG. 19. The ignition of admixture takes place by generating a spark between the central electrode and an adapter. The combustion flame generated by the spark is ejected from a tapered cup to the combustion chamber, thereby ensuring immediate combustion of the admixture. Further, a pre-combustion admixture is brought inside the spark plug (B) through vents by negative pressure generated by ejection in order to prevent overheating and fouling around the central electrode.

Spark plug (C), from the specification of U.S. Pat. No. 3,515,925, is indicated in FIG. 20. In the spark plug (C), the spark is generated between the extremity of a center electrode and near a conical aperture of an outer electrode so that the combustion flame is mainly ejected outward where resistance is less. Thereafter, a residual combustion flame induces combustion in the admixture inside the spark plug (C) and ejects the combustion gases horizontally from the radial bores, i. e. the ejection of the combustion flame from both the conical aperture and the radial bores is designed for immediate combustion of the admixture in the combustion chamber.

In all the spark plugs mentioned above, a combustion flame is ejected mainly in the direction of the axis of the spark plug for accelerating the combustion. Thus, the combustion pattern is similar to the conventional flame propagation from a spark plug igniting point at the center, and so not much improvement is made in terms of reduction of combustion time, uniform combustion or complete combustion of all of the admixture.

The problems of compression-ignition engines are as follows:

With regard to the direct-injection type, a long ignition-delay and a high combustion apex pressure bring about large combustion noise, and thus a strong construction is necessary for the main frame of engine. Also a large volume of N0x and dark smoke is emitted in the exhaust gas and diesel knock tend to be caused. If swirl is generated in the combustion chamber in order to solve the above mentioned problems, a new problem of increase of thermal loss arises.

With regard to the pre-combustion chamber type, the surface area of combustion chamber is large because a main combustion chamber and a pre-combustion chamber are both provided. Also high temperature gas passing through a small diameter connecting-hole increases the thermal loss and the energy loss induced at said connecting -hole, thus idle-knock tends to occur at low r. p. m. and friction loss increases at high r. p. m. Further, two combustion chambers, i. e. the main combustion chamber and the pre-combustion chamber, make the engine construction complicated and expensive.

With regard to the swirl-chamber type, thermal loss is increased by the swirl in the swirl chamber, where the surface area of the swirl-chamber is large, since the formation of the admixture depends on the swirl, the torque reduces with reduced r. p. m. Further, it must have both the combustion chamber and swirl chamber, thus the construction is complicated and expensive.

It is obvious at present that, regardless of whether considering a spark-ignition engine or a compression-ignition engine, any improvements in the internal combustion engine which are designed to improve the engine efficiency and reduction of pollutants and costs, depend on further acceleration of the combustion speed and on complete combustion of the fuel. In the continuous-flow internal combustion engine, stable and complete combustion, reduction of pollutants in the exhaust gas and improvement of the combustion efficiency are also to be desired.

DISCLOSURE OF THE INVENTION

A primary object of this invention is to control combustion in order to cause maximum explosive force and combustion automatically to obtain the effects of insuring power output, stable operation, reductions of pollutant in the exhaust gas, reduction of fuel consumption and reduction of noise in a spark-ignition engine in a compression-ignition engine.

It is an additional object to obtain the above mentioned effects by incorporating this invention in the spark plugs for already manufactured spark-ignition engines without any modification on such engines.

Another object of this invention is to control combustion for causing maximum explosive force and combustion automatically to obtain the effects of insuring power output, stable operation, reductions of pollutant in the exhaust gas and reductions in fuel consumption in a continuous-flow internal combustion engine.

One of the embodiments of this invention provides a means of incresing pressure of the admixture or the air locally at a zone of the combustion chamber in accordance with the flow of it during the compression cycle of either a spark-ignition engine or a compression-ignition engine, igniting it at said zone and exploding the flame resulting from combustion so as to envelope uncombusted gaseous medium or the air.

Another embodiment of this invention is a combustion system for an internal combustion engine comprising a guide means disposed within a combustion chamber to influence the flow of gaseous medium, the guide means comprising a funnel-shaped member with an orifice facing to igniting zone having a first passage enclosed by the guide means, the guide means being disposed to form a second passage in cooperation with a wall of the combustion chamber therethrough said zone, gaseous medium within the chamber being conveyable into said zone through the first passage and the second passage during the compression cycle, combustion product resulting from ignition and combustion in the zone cause flow through the second passage during a combustion cycle.

Another embodiment of this invention is a funnel-shaped cone provided at the front end of the spark plug with the specific spacing and the enlarged opening facing the piston, so that the spark position is determined adjacent the orifice of said cone and a tangent line of external surface of the cone intersecting at least part of the top surface of piston at the upper dead point.

Another embodiment of this invention is a truncated cone member positioned at the front end of the spark plug, an orifice being positioned in proximity to the extremity of the center electrode, the spark-gap being across the gap between adjacent to the orifice and the extremity of the center electrode, and determines the internal space surrounding the extremity of the center electrode between the end portion of said member including said orifice and the end portion of the insulating core.

Another embodiment of this invention is to provide a funnel-shaped baffle at the wall in a combustion chamber, having an orifice adjacent the wall to which it is secured in a manner to guide the flow of combustion product toward an enlarged opening through the external surface of the funnel-shape from the orifice area.

Another embodiment of this invention is to provide a sectionally funnel-shaped baffle at the wall in a combustion chamber of a continuous-flow internal combustion engine having an orifice adjacent to the intake port, an ignition device being located between the external surface of the baffle and the wall of the combustion chamber to ignite the admixture and combustion product and the un-combusted mixture being moved from the external surface to the inside space formed within the internal surface of the baffle and combust.

In summary, this invention presents a new means for improving the operation of internal combustion engines by introducing a new funnel-shaped cone or a baffle into the combustion chamber of an internal combustion engine in order to control freely the admixture flow and combustion to optimal condition, in the conventional technology those were able to change only slightly with the modification of the shape of an internal surface of the combustion chamber.

BRIEF DESCRIPTION OF THE DRAWINGS

FIG. 6 A is a view of the spark plug of FIG. 3 looking toward the terminal.

FIG. 10 A is a fragmentary enlarged view of the combustion chamber of FIG. 10.

MOST PREFERRED EMBODIMENT FOR PRACTICING THE INVENTION

The operating principle of the system of this invention, when it is applied to a spark-ignition engine, is as follows, refering to FIG. 1.

Figure 1:
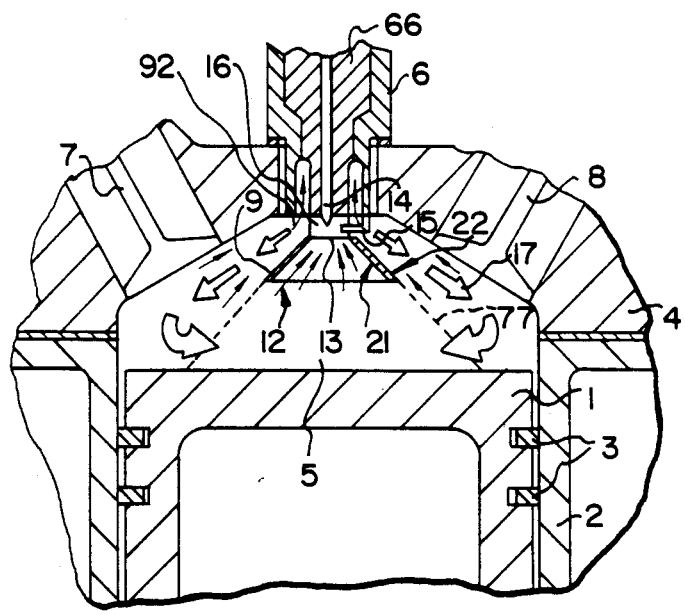
FIG. 1 is an enlarged sectional view of the combustion chamber portion of a spark-ignition engine explaining the process of combustion in a preferred embodiment of this invention.

In FIG. 1, piston 1 is placed to freely reciprocate under the airtight condition, sealed by piston ring 3, in cylinder 2. Cylinder head 4 is positioned above cylinder 2 with airtight sealing. Combustion chamber 5 is formed by the piston 1, cylinder 2 and cylinder head 4. Spark plug 6, intake valve 7 and exhaust valve 8 are positioned in the cylinder head 4.

In the combustion chamber 5 a funnel shaped cone 9, the characteristic of this invention, is disposed under the spark plug 6. With a specified space, the small orifice 13 of the cone faces the center electrode 14 of spark plug 6, thus forming an igniting zone 16 between the small orifice of the cone and the spark plug 6. The angle of the sloped annular wall of the cone 9 is determined in such a manner that the tangent line 77 of the external surface of the cone extended from the bottom edge intersects with at least a part of the upper surface of the piston 1 when it is reciprocated to the upper dead point.

In the spark-ignition engine, during its intake stroke, intake valve 7 opens to let the admixture be sucked into cylinder 2, as the piston 1 reciprocates downward. After the intake valve 7 is closed when the piston 1 reaches its lower dead point, the piston 1 starts upward reciprocal movement for executing the compression stroke, and the admixture in the cylinder 2 is compressed while flowing upwardly by the upward movement of piston 1. Admixture located outside of the cone 9 passing through the first passage between the external surface 22 of the cone 9 and the cylinder head (arrow 92) flows into the internal space of the spark plug 6 and admixture located below cone 9 passing through, the second passage (arrow 12) which has substantially narrower gas passage area than the first passage through the inside of the cone 9, is converged and compressed at the igniting zone 16, defined by the small orifice 13 side end portion of cone 9, the combustion chamber side extremity of center electrode 14 and the extremity of insulating core 66. It thereby becomes an admixture higher in pressure than admixture in its neighboring place. The admixture is ignited by the spark discharge across the center electrode 14 and outer electrode 15 of spark plug 6 before the piston 1 normally reaches its upper dead point, and starts combustion and becomes a flame kernel. As mentioned above, the narrowest distance between the center electrode and outer electrode is located around the small orifice.

This flame kernel, with the admixture 12 continuously compressed and flowed in, disperses itself widely in the igniting zone 16 and also moves with the air flow of arrow 92 then internal admixture in spark plug 6 also starts combustion. The flame 17 ejects out radially through the first passage and, together with the jet flow of high temperature combustion gas, envelopes the admixture yet to be burnt located adjacent the upper part of piston 1. The igniting zone 16, after the flame 17 has been ejected out, reaches a negative pressure with respect to its surrounding space, yet admixture, being enveloped and pushed by the ejected flame 17 from its sides and bottom, is heated and compressed and flows into igniting zone 16 under a high pressure, through the cone 9 as mentioned before (arrow 12), and is then ignited by the residue radicals of C2 and CH etc., and the combustion flame 17 once more radially ejects from the space between the external surface of cone 9 and cylinder head.

This combustion cycle continues until all the admixture in combustion chamber 5 and igniting zone 16 is completely burnt, and completes its combustion in an extremely short time and gives a thrust pressure to the piston.

This invention is operable not only in the semi spherical and penta-roof type and similar combustion chambers as an example but in other shapes of combustion chamber such as the wedge type, the bathtub type and the bowl-in-piston type and the like. The shape of the top surface of the piston need not be a flat surface as illustrated in FIG. 1, but can be made in a variety of shapes to obtain good results, for example, by concaving the part of the top surface of the piston where it faces the cone, and by other shapes, so as to effect advantageous flow of admixture.

Figure 2B:
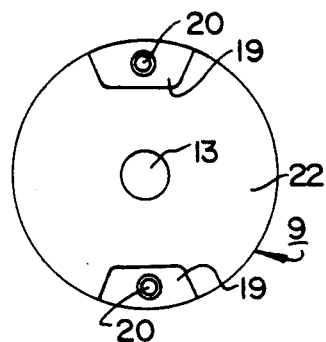
FIG. 2(a) to FIG. 2(c) are an elevation, a plane and a longitudinally sectional view of one example of a cone embodying this invention.
Figure 2C:
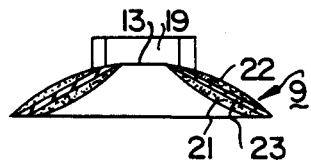
Figure 2A:
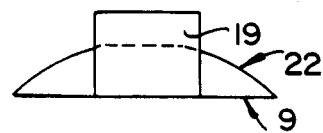
Figure 3:
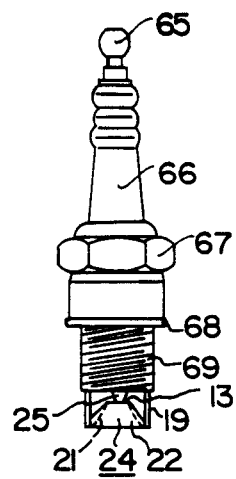
FIG. 3 to FIG. 6 are an elevation view, side elevation view, a longitudinally sectional view, and an end elevation view looking toward the firing end respectively for an embodiment of the spark plug covered by this invention.
Figure 4:
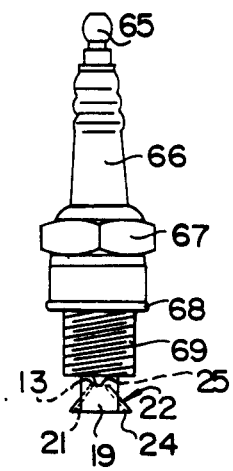
Figure 6:
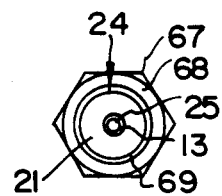

FIGS. 2(a) to 2(c) illustrate details of one example of the cone 9, where the cone 9 is of the type having a leg 19 on its side. By means of the leg 19, the cone 9 is located at the specified position in the combustion chamber of an internal combustion engine. For instance, the cone 9 and the leg 19 may be manufactured integrally with the cylinder head or may be provided with a screw hole 20 on the leg 19, and by means of said screw hole 20 the cone 9 can be placed in the combustion chamber. Explanation is given in the following of the detailed shape of cone 9 with, the inner surface of cone 9 being defined as internal surface 21 and outer surface being defined as external surface 22. The internal surface 21 lets admixture pass over it giving it convergence as it passes, while the external surface 22 lets the admixture eject outwardly from the space between cylinder head surface as a combusting flame, toward the outer periphery of upper surface of piston 1 at near the upper dead point. Therefore, the shape of the internal surface 21 is preferably such that the convergence can best be effected and may be, for instance, of exponential shape. The shape of said external surface 22 is preferably such that the combustion flame be most effectively ejected out, for example, the external surface may be such that the space between the opposing cylinder head has the shape of an exponential horn. In order to effectively envelope the admixture with the combustion flame, it is desirable that the external surface 22 be disposed in such a manner that at least a portion of the combustion flame is directed at the outer peripheral part of the top surface of piston 1 when it is reciprocated near to the upper dead point. Moreover, by forming a spiral groove on the external surface 22 or on the opposing walls, the ejecting combustion flame can have a spiral motion to it to further promote combustion.

Further, the cone 9, in FIGS. 2(a) to 2(c) is in the shape of a round disk in plan view, but the shape can be altered to any other suitable shape, for example, an oval shape, etc., depending on the shape of the combustion chamber 5. The outer peripheral portion can also be provided with one or more peripheral portions cut away so that the cone will not interfere with the movement of the intake valve 7 or of the exhaust valve 8.

Further, depending on the location of the spark plug 6 in the combustion chamber 5, the cone 9 may be placed at an angle. The shape of the small orifice 13 of the cone is not necessarily round, and can be formed offset from the large orifice of the cone.

The cone 9 reaches a high temperature, being exposed to the combustion flame and it is desirable that it be made of temperature-resistant ceramics or metal. For such ceramics, suitable examples of materials are alumina, carbonized silicon, aluminum nitride, etc., having high heat conductivity which is desirable for heat dissipation and cooling. For such metal, heat resistant alloy is to be considered. However, above mentioned materials surface should be provided with a heat-insulation coating, unless enough heat dissipation be effected, in order to prevent the admixture from being prematurely ignited prior to ignition by the spark plug 6 due to the heat of the cone 9 itself caused by engine rotation at high speed, and to protect metal from high temperature. For example, as illustrated in FIG. 2(c), from an inexpensive and easily machinable material, such as machinable steel, a cone-shaped substrate 23 can be made, with its inner surface that performs as the internal surface 21 preferably provided with a plasma-coated ceramics or heat-resistant alloy having high heat conductivity, thereby preventing the substrate 23 from being oxidized and whereby cooling of the substrate by the incoming admixture can be effected, the external surface 22 being provided with thermal barrier coating, T. B. C., for preventing the surface from being oxidized, to be heat resistant and to reduce heat conduction to the substrate 23, so that the temperature rise can be alleviated. For such T. B. C., such materials as Ni-Co-Cr-Al alloy and CERMET may for example be effectively used for coating on the surface of the substrate 23 as a bonding layer, then, for example, $ZrO_2$ $8Y_2O_3$, etc. can be plasma-coated thereupon in that order. The same material used for the bonding layer of the T. B. C., since it is heat resistant material, can be coated on the internal surface of the cone as an anti-oxidation layer. By providing the T. B. C. on not only the external surface of the cone but also on the surface exposed to flame, heat isolation and prevention of oxidation can be effected. When the cone is made of heat-resistant alloy, for example SUS 310s, only T. B. C. is required for the external surface 22 in some cases.

One method to improve the heat dissipation of the internal surface 21 is to form it with an irregular rough surface in order to increase the surface area for increase the heat radiation area, alternatively, small holes or slits can be provided that run from the internal surface 21 to the external surface 22.

As above mentioned, according to this invention, by providing the cone 9 in combustion chamber 5, and as a result of the flow of the admixture during the compression cycle, the admixture is brought to a pressure higher than the pressure in the neighboring space and is ignited, therefore, even with a lean admixture, reliable ignition is possible, and flame resulting from combustion can be ejected out radially along the combustion chamber wall surface, to effect a high-speed propagation of flame with less resistance and to let the flame envelope the pre-combustion admixture located above the piston head, to ensure complete combustion. This also is effective in preventing knocking by igniting the admixture in corners promptly.

In FIG. 1, the outer electrode 15 of spark plug 6 can be eliminated by using an electrically conductive material for the cone 9 and by giving a proper distance between the center electrode 14 and small orifice 13.

As for further detailed explanation of the effect of the invention in reducing pollutants in the exhaust gas, HC can be reduced by the flame jet removing admixture from the wall surface, which is then enveloped and burnt without leaving a residue by circulation. CO can be reduced by the sufficient mixing of the admixture as aforementioned, whereby oxygen is supplied in adequate quantity. NOx can be reduced by the combustion taking place at high speed by envelopement and circulation of the flame, burning the entire fuel completely without local high temperature caused by stagnant admixture and immediate reduction of temperature under fast flow.

FIGS. 3 to 6 show practical embodiments of this invention applied to conventional spark-ignition engines.

When applying this invention to conventional spark-ignition engines, the cone 24 must be provided on the axis of spark plug 6. In this embodiment the cone 24 is provided on the tip of spark plug 6. The cone 24 is of the same construction as that of the cone 9, where the shell 67 of the spark plug 6 has been integrally formed, or has been separately made and welded with the leg 19 in one piece.

Figure 7:
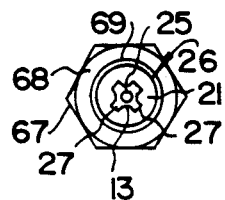
FIG. 7 is an end elevation view same as FIG. 6 showing modification of the small orifice.

The cone 24 in this instance is made of electrically conductive material, for instance metal, and performs as an outer electrode by making it integrally, or making it separately and welding it together with the shell 67 of the spark plug 6. The spark takes place between the tip of the preferably substantially conically shaped center electrode 25 and the small orifice 13. The center electrode 25 is preferably of substantially conical form for the reason that a conventional spark plug having a flat tip center electrode interferes with the smooth flow of admixture from the small orifice 13 area and thus causes incomplete combustion, and carbon tends to accumulate on the flat tip of the center electrode. The conically shaped electrode avoids such tendencies. The tip of the center electrode 25 is disposed close to the small orifice 13, with a proper electrical spark discharge gap between the inner periphery of the small orifice 13 and the tip of center electrode 25, for example 1-2 mm. The opening area of the small orifice 13 can be enlarged with the discharge gap maintained, as illustrated in FIG. 7, by providing it with cut-aways 27 at the periphery of small orifice to leave a cruciform shape orifice. The orifice may be in the shape of a circle with a projection. It is advisable that the cut-aways be located in such a way as to let the spark take place at the center of the open angle of the cone's ejection port.

Figure 5:
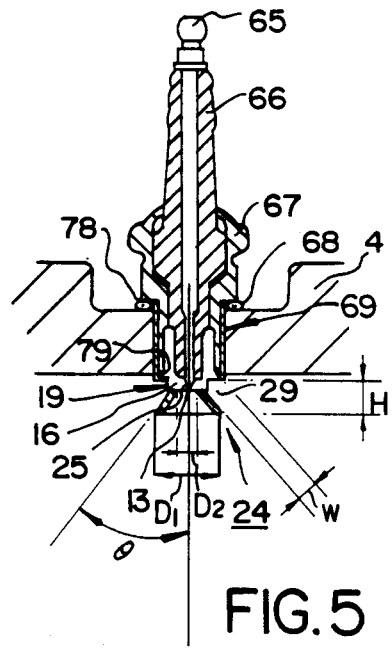

Outer diameter $D_1$ of the cone 24, in FIG. 5, is determined for most efficient operation depending on the diameter of cylinder and the shape of combustion chamber. However, the maximum diameter is so designed to fit the screw hole for the spark-plug on cylinder head 4, and the height H of the portion of the cone 24 protruding into combustion chamber 5 is determined in such a way that the protrusion does not interfere with the piston 1, the intake valve 7 or the exhaust valve 8. Inner diameter $D_2$ of small orifice 13 is preferably 3-5 mm corresponding to the spark gap of 1-2 mm. The inner surface of the small orifice 13 of the cone 24 that faces said center electrode 25 is preferably shaped in a sharp wedge as shown in FIGS. 2 and 5, whereby the spark takes place without fail at a predetermined place between the edge and the center electrode. Further, this sharp wedge shape of the inner edge is desirable in that it makes the cone also serve more effectively as a check valve preventing reverse flow of admixture, while letting the admixture and burned gas pass easily in one direction. Even when the periphery of the small orifice 13 has a certain length extending axially to the flow of admixture, a length less than the distance between the center electrode 25 and the periphery of the small orifice 13 is preferable, since if the length at the periphery of the small orifice 13 is greater, the combustion flame which ignited by the spark generated between relatively lower pressure concave area of the cone and center electrode would tend to fail to travel into the igniting zone but would tend to reverse back into the combustion chamber 5, in which case the cone 24 of this invention would not perform its expected function, and would act only as a conventional spark plug.

The substantial gas passage area of the pass from the small orifice 13, via the igniting zone 16, up to the ejection port 29 formed by the lower edge of the shell 67 and the outer periphery of cone 24, and the ejection port should not have any narrower portion than the substantial gas passage area of the small orifice 13. If there is a narrower portion then it interferes with the combustion flame in the igniting zone 16 moving toward the ejection port 29, and it tends to eject backward from the small orifice 13 back into the combustion chamber 5, failing to effect the objective of this invention and causing insufficient combustion, such as smolder, in the igniting zone 16 or inside of the spark plug, thus resulting in ignition failure of the admixture in the combustion chamber 5.

The external surface 22 of the cone 24 is made with an opening angle $\theta$ that lets the combustion flame eject out along this external surface 22 toward the periphery of the upper surface of the piston 1 near the upper dead point as mentioned above, and in this preferred embodiment $\theta$ is approximately 45° to the axis of cone 24.

Furthermore, if the opening window width W of the ejection port 29 of the cone 24, that is, the distance between the bottom end of the shell 67 of the spark plug 6 and the outer periphery of the cone 24, is too small, resistance to ejection of combustion flame is increased, and if too large, the protrusion height H of the cone 24 becomes too large, whereby the cone 24 interferes with the upper surface of the piston 1, the intake valve 7 or the exhaust valve 8. Therefore, it is necessary to determine this dimmension within a certain limit where the above mentioned problems are solved. In this preferred embodiment, more than 2 mm is required and more preferably, the dimension is more than 3 mm.

With respect to the shape of the above mentioned ejection port 29, if it is of round shape, the ejected combustion flame from the ejection port 29 can easily be extinguished by the swirl of the admixture. A rectangle or an eliptical shape, etc. having a longer axis directed to the direction of said swirl, is preferred over a round shape.

The actual opening area of the ejection port 29 is limited by the leg 19. If the leg 19 is slender, the opening area is increased but the heat dissipation is decreased. If the leg 19 is thick, the heat dissipation problem may be solved but the opening area decreased, whereby the ejecting resistance increases. An actual opening area for the ejection port 29 of more than 33% of the cylindrical surface which consists of outer diameter $D_1$ of cone 24 and height H of cone 24, as shown in FIG. 5, is preferable. And in this preferred embodiment approximately 65% is most appropriate. The substantial gas passage area of the ejection port of more than four times larger than the substantial gas passage area of the small orifice 13 is preferred. In order to make the ejection of the ignited admixture in the inside of the spark plug smooth, it is preferable to taper cut the inside edge of the spark plug shell extremity as indicated at 79 in FIG. 5.

As described above, in this preferred embodiment, a conventional spark-ignition engine may be modified to achieve the same effect as the aforementioned embodiment, with low cost, without any alteration of the engine construction, if the original spark plug is replaced with the above described spark plug having the cone at its extremity. Another surpassing characteristic of said spark plug of this invention is that, as the substantial spark zone is covered by the cone, miss fire can be avoided when starting the engine and during excessive acceleration, since the fuel mist can not moisten the electrode.

Furthermore the inside of the spark plug is kept very clean because the admixture and the stream of combustion flame circulate in this embodiment.

The presence of a ceramic coating on the internal surface of the spark plug shell 67 beginning from the taper cut 79 up to the bottom end where facing to the insulating core 66 may further reduce the drift of combustion debris.

From the experiments of the present inventor it has been discovered that a preferable direction of flame ejection i.e. the direction of the ejection port of this spark plug exists. If the ejection port is aligned with the intake port for the admixture or air, whereby the cone may be cooled down by the fresh admixture or by the air introduced from the intake port to the ejection port, further, the fresh admixture or air is introduced in sufficient quantity toward the igniting zone. In this manner, powerful combustion can be effectively initiated. In order to provide the alignment of direction for the replaceable spark plug, this inventor recommends that the following method may be employed.

Figure 6A:
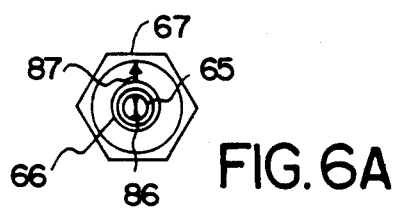

First, the angular relationship between the cross point of the outer shell screw 69 to the retaining edge 78 of the spark plug and the direction of the ejection port depends upon the specific relationship, on the engine itself, where the lead-off point of the screw for the spark plug bore of spark plug inserting end can be determined so as to direct the ejection port in the proper direction when the spark plug is installed. For engines wherein the screw is already provided and the ejection port is not directed in the preferred direction, alignment can be made by selecting the thickness of the gasket 68 or inserting a washer of proper thickness between the gasket 68 and the retaining edge of the spark plug. Once the spark plug is screwed into the engine, it is impossible to see the direction of the ejection port. This inventor prefers the method in which the direction of the ejection port is indicated by providing a mark 86 or 87 on the outside of the spark plug, for example on the terminal, which is visible after insertion, as shown in FIG. 6A.

This invention is effective in a rotary engine also. In the rotary engine, the direction of the ejection port may be directed toward the rotating direction of the rotor thereby enabling the fresh admixture to be introduced.

If the ejected flame, as described above, from the gap between the external surface of the cone 24 and the spark plug shell immediately contacts with the cylinder head, deformation of such area may be caused by heat. It is therefore preferable that the extremity of the shell protrudes from the internal surface of cylinder head as shown in FIG. 5. Other methods, such as, for example, providing a T. B. C. for the area of the cylinder head exposed to the ejected flame at the periphery of the bore for the spark plug, or adopting a heat resistant alloy for this area, are also possible to avoid the deleterious effects of high temperature.

Although the above description is for a single spark plug, it is, however, obvious that the invention can also be applied to multiple spark plug systems.

Regarding the above mentioned spark plug with the cone, it may be required to increase the cone's outer diameter $D_1$, but such outer diameter can not be larger than the inner diameter of the fixing screw. In such case, it is possible to increase substantially the diameter by providing an annulus having its internal diameter matched with the cone's outer diameter and coordinated with the cone of the spark plug, the annulus being supported on the internal surface of the cylinder head.

Figure 8:
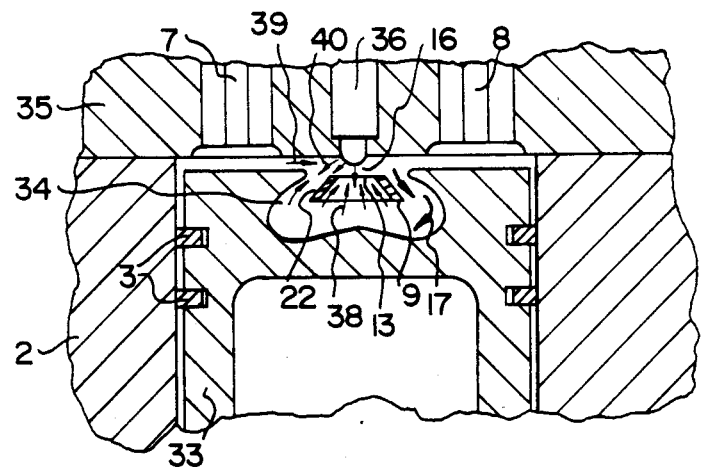
FIG. 8 is an enlarged sectional view of the combustion chamber portion of a compression-ignition engine applying the invention.

In FIG. 8, a combustion model is described for this invention applied to a conventional compression-ignition engine.

In the drawing, piston 33 has a combustion chamber 34, this piston 33 reciprocating in the cylinder 2 with piston ring 3 rendering it airtight. The cylinder head 35 is fixed in airtight manner on the cylinder 2, and the space between the cylinder head 35 and piston 33 at upper dead point is arranged to be minute. At the cylinder head 35, a fuel injection valve 36 is installed for injecting fuel into the combustion chamber 34 and an intake valve 7 an exhaust valve 8 are located on each side of the injection valve 36 respectively. The cone 9, characteristic of this invention, is provided on the cylinder head 35 in line with the axis of the fuel injection valve 36. The cone 9 is attached to the cylinder head 35 using the screw hole 20 of the leg 19, as illustrated in FIG. 2(b), or is fabricated with the cylinder head 35 in one piece. The geometrical relationship between the cone 9 and the combustion chamber 34 is determined so that the sectional area of the passage for the combustion flame 17 at the outside of cone 9 is not smaller than the passage at the outer edge of the cone where the combustion flame 17 has to leave the cone 9 by ejection from the igniting zone 16 when the piston has reached the upper dead point.

In the above mentioned compression-ignition engine, the air, sucked into the cylinder 2 during the intake stroke, flows upward with compression by upward motion of piston 33. The air stream 38 at the bottom of the cone 9 is further converged through the internal surface of the cone 9 as shown in the figure, thereby attaining a higher pressure and a higher temperature at the igniting zone 16 which is formed by the combustion chamber side extremity of fuel injection valve 36 and the small orifice 13 and creating the highest air density.

Corresponding to the piston 33 reaching the upper dead point, the air between the upper periphery of the piston 33 and the cylinder head 35 becomes a squish air stream 39 and running to around the igniting zone 16, the fuel is injected from the fuel injection valve 36 against the high pressure and high temperature air in the igniting zone, and the injected fuel is dispersed, atomized, evaporated and heated by the high temperature and high pressure air and then ignited before the upper dead point. Since the ambient temperature and pressure are the principal factors of time required for igniting, i.e. the ignition delay, in the compression-ignition engine, the ignition delay may be reduced because the temperature and pressure at the igniting zone are increased by the cone 9, and furthermore, the igniting zone 16 is not influenced by the swirl of the air or other turbulence in the combustion chamber 34, whereby ignition takes place in a stable condition. Regarding the injection of the fuel 40, as illustrated, various cases can be considered such as directly injecting to the igniting zone 16, the case in which the fuel hits the external surface 22 of cone 9 and is heated, and the case in which the fuel is injected to the direction of the small orifice 13, then pre-mixed with the air stream coming into the small orifice 13, etc., the ignition and combustion condition may be determined depending on the purpose of the engine by appropriately combining the above for mixing the fuel with the air.

In addition, FIG. 8 shows, for convenience of explanation, the air stream and the injected fuel 40 on the left hand side and the combustion flame 17 on the right hand side from the center of the figure.

The combustion flame 17, thus ignited as above, ejects radially from the passage between the external surface 22 of the cone 9 and cylinder head 35 and the internal surface of piston 33 to the combustion chamber 34 as illustrated. And at such time the uncombusted fuel particulates are also ejected and rapidly mixed with the air in the combustion chamber 34 and burnt.

After the combustion flame is ejected, the pressure in the igniting zone 16 becomes negative. This sucks in the air stream 38, which receives pressure and heat from the side and the bottom as the above mentioned combustion is added to the combustion flame 17. The air stream 38 therefore rushes into the igniting zone 16. The air stream 38 is mixed with the fuel injected from the injection valve 36 and ignited by the residual radicals such as $C_2$, CH, etc., and thereafter, this combustion flame 17 ejects again to the direction as explained and shown in figure. At the same time, the heat of the external surface 22 of the cone 9 further accelerates the ignition and combustion. The above mentioned series of combustion processes proceed at a high speed, and circulation continues until all the fuel in the combustion chamber 34 is burnt. The external surface 22 of the cone may be cooled by the evaporation of the fuel. In addition, it is possible to convert alcohol into $H_2$ and CO or reform heavy oil to light oil if a catalyst is provided on the external surface. And also water injection, separately from the fuel, onto the external surface makes explosive evaporation possible.

As described above, according to this invention, in the compression-ignition engine, the ignition delay becomes shorter and stable at each cycle, and the fuel evaporation and mixing with the air is accomplished completely. In this manner a series of stable combustion processes are effected and local high temperature combustion and explosive deflagration are eliminated. Therefore an engine operating with reduced noise and with reduced pollutant in the exhaust gas becomes available.

It is possible to control the combustion freely to the preferred combustion cycle from Otto cycle to Diesel cycle employing the proper choice of combustion chamber, the igniting zone, the shape and dimension of the cone, etc., the fuel injection characteristics and the compression pressure, etc. The invention is adaptable to a wide range of engines from low to high r. p. m. engines, and furthermore, in comparison with the conventional pre-combustion-chamber type and swirl-chamber type, the system increases heat efficiency because the heat loss is smaller as a result of the small total surface area of the combustion chamber.

Figure 9:
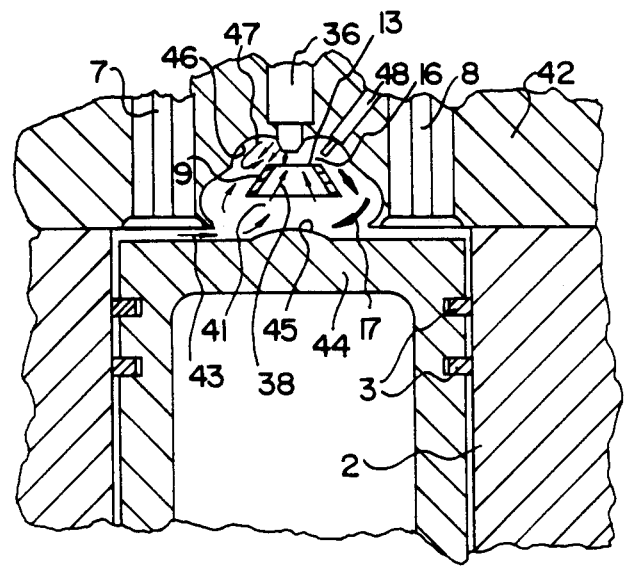
FIG. 9 is an enlarged sectional view of the combustion chamber portion of a compression-ignition engine of a type different from FIG. 8 applying the invention.

Next will be described the combustion process of an embodiment wherein this invention is applied to a type of compression-ignition engine shown in FIG. 9. The principal difference between this compression-ignition engine and the compression-ignition engine shown in FIG. 8 is that in this case the combustion chamber 41 is located not in the piston 44 but in the cylinder head 42 and combustion chamber cooling is simply accomplished through the cylinder head. The squish air stream 43 is deflected by the protuberance 45 on the center of piston 44 to the direction of the cone 9. A hollow 46 for swirling is provided around the ignition zone 16. The air flow into the hollow 46 becomes a swirl 47 therein and is intensively mixed with the injected fuel.

A glow plug 48 is provided near the igniting zone 16 in order to improve the starting ability at lower temperature, thereby allowing a lower compression ratio than in the aforementioned compression-ignition engine.

According to this invention, the mixing of the air stream in swirl condition with the injected fuel after ignition is a great advantage. Further, no combustion gas remains in the sub-combustion chamber unlike the conventional sub-combustion chamber type engine, the gas may be ejected simply from the igniting zone as exhaust gas.

In this embodiment, the two legs 19 for the cone 9 can be installed under an electrically insulated condition on the cylinder head so as to allow for feed of electric current to the cone 9 through the legs 19 for heating the cone 9 itself. The cone may then constitute the glow plug thereby enabling elimination of the glow plug 48 and allowing a more simple construction for the engine. When the cone 9 is so designed as to be heated itself by feeding the electric current through it, an engine adaptable for various types of fuel is presented, as the temperature of the cone 9 may be approriately changed depending on the value of Cetan Number of the fuel.

By replacing the glow plug with a spark plug, the spark-ignition engine with direct fuel injection into the combustion chamber is easily constructed.

Further in this embodiment if a lean admixture is drawn instead of air, and the fuel or a rich admixture is supplied to the igniting zone from the fuel valve, stratified lean combustion can be achieved.

The above description relates to four cycle engines but it is obvious that this invention is easily applicable to two cycle engines also in the same manner.

Figure 10:
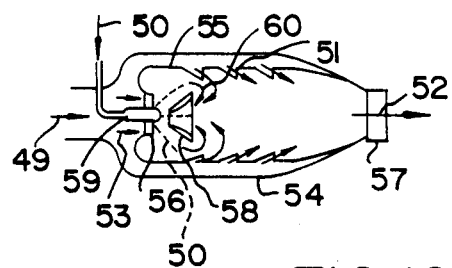
FIG. 10 is a schematic sectional view of a combustion chamber of a continuous-flow internal combustion engine applying the invention.

The present invention is also applicable to continuous-flow internal combustion engines of the pot type and annular combustion apparatus type as illustrated in FIG. 10. In FIG. 10, pressurized air 49 is supplied to the engine. A fuel supply 50 is provided to an injection valve 59. Secondary air 51 is fed into an inner can 55 after passage between an outer can 54 and the inner can 55. Primary air 53 is supplied to the front-end of the inner can 55. A swirler 56 produces a swirl air stream in the primary air 53 in order to effectively combust the fuel 50' injected into the inner can 55 from the injection valve 59. A nozzle 57 ejects the combustion gas 52. The cone 58 is a characteristic of this invention. The circulating stream 60 is caused by the cone 58.

Figure 10A:
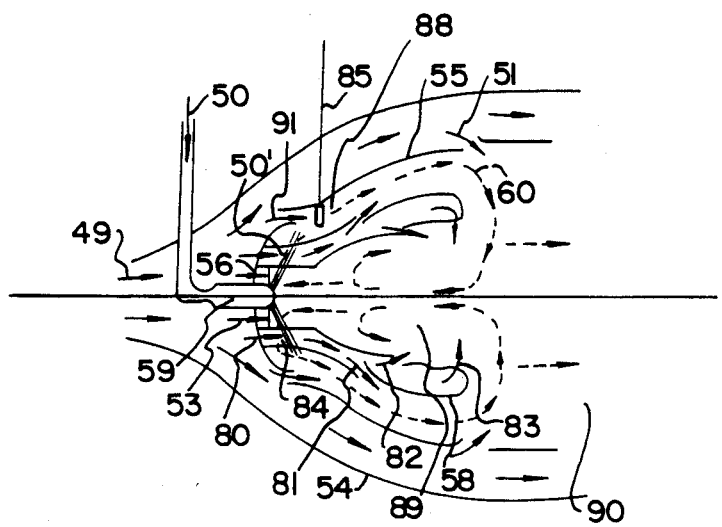
Figure 11:
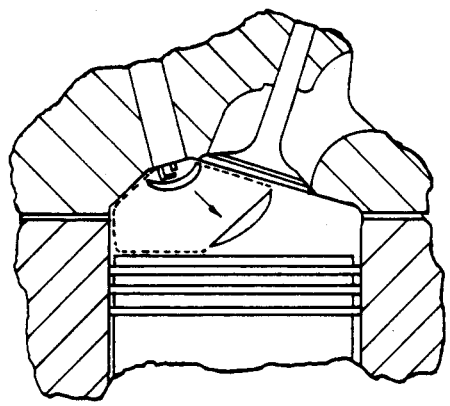
FIG. 11 is a sectional view of the combustion-chamber portion of a conventional spark-ignition engine.
Figure 12:
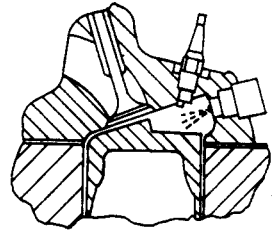
FIG. 12 is a sectional view of the combustion-chamber portion of a fuel-injection-to-combustion-chamber type spark-ignition engine.
Figure 14:
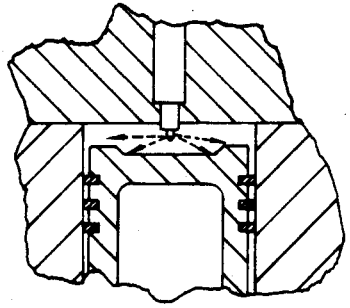
FIG. 14 is a sectional view of the combustion-chamber portion of a conventional direct-injection type compression-ignition engine.
Figure 13:
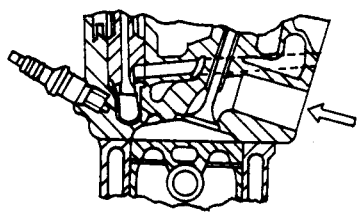
FIG. 13 is a sectional view of the combustion-chamber portion of a CVCC type spark-ignition engine.
Figure 15:
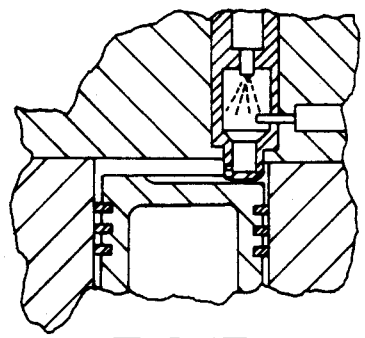
FIG. 15 is a sectional view of the combustion-chamber portion of a conventional pre-combustion chamber type compression-ignition engine.
Figure 16:
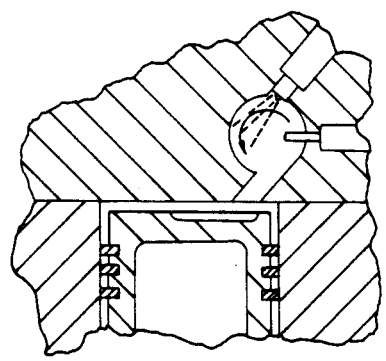
FIG. 16 is a sectional view of the combustion-chamber portion of a conventional swirl-chamber type compression-ignition engine.
Figure 19:
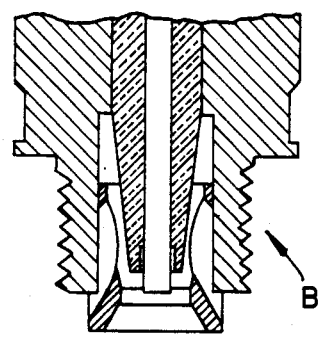
FIG. 19 is a fragmentary sectional view of a spark-plug disclosed in U.S. Pat. No. 3,056,899.
Figure 18:
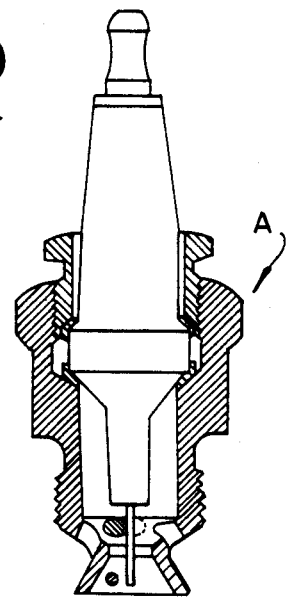
FIG. 18 is a sectional view of a spark-plug disclosed in U.S. Pat. No. 1,929,748.
Figure 20:
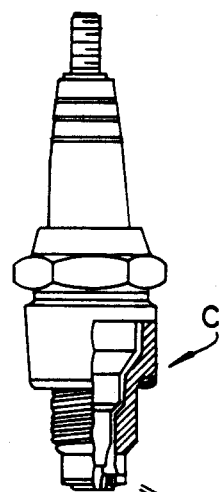
FIG. 20 is an elevation, in partial sectional, with a fragmentary section on an enlarged scale of the front end portion of the spark-plug disclosed in U.S. Pat. No. 3,515,925.
Figure 17:
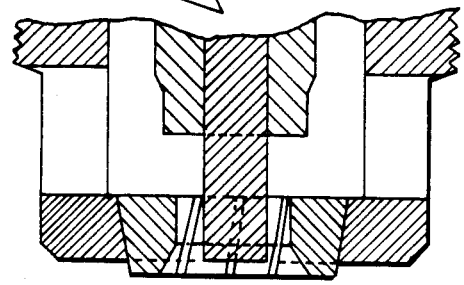
FIG. 17 is a longitudinally sectional view of a conventional spark plug.

The embodiment is described further in detail with FIG. 10A. The cone 58 is in the form of a hollow member and is installed at the front end of the inner can 55 by at least one hollow mounting member 84. Pressurized air 49 is fed into the inside of the cone 58 through the hollow mounting member 84 as shown by the arrow, 80, thereby cooling the cone, and is ejected from the outer surface of cone as shown by the arrow 81, from the inner surface of cone as shown by the arrow 82, from the rear end peripheral edge of cone as shown by the arrow 83, and is thereafter utilized for combustion and cooling. Regarding the direction of the ejected air, it may take the most effective direction corresponding to the shape of the aperture.

The T. B. C. of this embodiment is provided on the necessary surfaces of high temperature parts, for example on the inside surface of inner can 55, on the hollow cone 58 and on the surface of hollow mounting member 84.

The combustion mechanism of this embodiment is described as follows. The fuel 50 is injected from the injection valve 59 as line 50' shows and is mixed with the primary air 53 supplied through the swirler 56 and the air 91 supplied from a part of the inner can 55, and is ignited by the ignition apparatus 85 at the ignition combustion zone 88. The flame, combustion gas and radicals are mixed with the air 81 ejected to the outer surface from the inside of cone, move as shown by the dotted arrow 60, and then flow into the primary main combustion zone 89 while being mixed with the air 83 ejected from the large extreme periphery of the cone where they are burnt while being mixed with the air 82 ejected to the inner surface from the inside of cone. The flame, combustion gas and radicals move to the secondary combustion zone 90, continue further combustion and finally are ejected from the nozzle 57 in FIG. 10 to the outside of the combustion apparatus.

A part of the flame, combustion gas and radicals in the primary main combustion zone 89 are circulated to the ignition combustion zone 88 by the pressure difference thereby assisting the continuous ignition of uncombusted admixture and the mixing of the fuel and the air. In this embodiment, as described above, as the ignition combustion zone 88 and the primary main combustion zone 89 are separated by the cone 58, the ignition and combustion become stable. Further, as the air which cools the inside of the cone ejects to each of the combustion zones as indicated by reference numerals 81, 82 and 83, not only does the air mixing become satisfactory but also a necessary reduction of the temperature of the combustion gas and cooling the cone surface become possible, these are particular advantages of this invention over the conventional systems.

In the case in which the combustion in the ignition combustion zone is reduced, a sufficient amount of the flame, combustion gas and radicals for continuous combustion are automatically supplied from the primary main combustion zone in accordance with the pressure difference, thus preventing stall and power decrease.

It is obvious from the above description that this invention presents stable and complete combustion in all continuous-flow internal combustion engines including Turbo-Jets, Ram-Jets, SCRAM-jets and Rockets, and therefore high reliability, high power output and reduction of pollutants in the exhaust gas are possible.

A combustion device in which the admixture is supplied to the embodiment instead of the pressurized air 49 is another application of this invention.

According to this invention it is possible to control the combustion, as explained above. With reference to a spark-ignition engine, reliable ignition and instantaneous and complete combustion are possible even with a lean admixture. With reference to a compression-ignition engine, a reduction of ignition delay, stable ignition and combustion, atomization of injected fuel and proper mixing with the air and the uniform combustion are provided, thereby enabling an effective combustion of the fuel, and an increase in the engine power output by the improvement of the thermal efficiency. A decrease in the fuel consumption and in pollutants in the exhaust gas can be achieved. Furthermore, it is possible to provide the internal combustion engine with highly stable starting ability and running as a result of reduction of the carbon deposition in the combustion chamber. By maintaining the inside of the combustion chamber always clean, the spark plug is protected from fuel soaking, contamination and wear. In addition, it is possible to operate the engine under a high compression ratio for high power output and to employ a lean admixture since knocking is prevented. Another advantage of the invention in a spark-ignition engine is that direct fuel injection to the combustion chamber type engine can be realized with simplicity and low cost. In a compression-ignition engine, a multi-fuel engine and low noise engine are realized with simplicity and low cost.

Furthermore, according to this invention, by replacing the conventional spark plug of an existing spark ignition engine with the apparatus of this invention, the above mentioned effects can be achieved stably and simply without any modification in the engine itself.

I claim:

1. A combustion method for an internal combustion engine, comprising increasing the pressure of the gases locally at a zone in a combustion chamber in accordance with flow of the gases during a compression cycle, igniting said gases at said zone in said combustion chamber, and exploding the flame resulting from ignition so as to envelop uncombusted gases along walls of said combustion chamber.

2. A combustion method for an internal combustion engine having a combustion chamber comprising an end wall and a depending side wall forming a partly enclosed combustion chamber and a compression member retractably disposed in relation to said walls to close said chamber in variable volumetric capacity, one of said walls being provided with means for admitting fuel and a gaseous medium adapted to support combustion, a predetermined igniting zone being provided in said chamber, comprising: disposing a guide means within said chamber to influence the flow of gaseous medium within said zone, said guide means comprising a funnel-shaped member having a small opening facing said zone and an opening of increased dimension opposed thereto, a first passage enclosed by said guide means, said guide means being disposed to form a second passage in cooperation with a wall of said chamber therethrough said zone, gaseous medium within said chamber being conveyable into said zone through said first and second passages during a compression cycle caused by movement of said compression member, the gas passage area of said second passage being substantially larger than the gas passage area of said first passage whereby combustion products resulting from ignition and combustion in said zone cause flow through said second passage during a combustion cycle, and exert thrust pressure on said compression member.

3. In an ignition device for an internal combustion engine wherein an outer shell and a center electrode composed of one end is connectable with electrical source and the extremity of another end is provided as an electrode for spark discharge located at a center therein, an insulating core surrounding said center electrode and disposed within said outer shell, and said extremity of center electrode is exposed from said insulating core, said ignition device further comprising a truncated cone member combined with said outer shell from adjacent to said extremity of center electrode to the direction of extending a front end of said ignition device, with an orifice of said member positioned in proximity to said extremity of center electrode and opening of increased dimension opposed thereto, and a substantial spark gap is located between said extremity of center electrode and adjacent to said orifice, said orifice delimiting an internal zone surrounding said extremity of center electrode between an end portion of said member including said orifice and an end portion of said insulating core, and in which a total substantial gas passage area of openings other than said orifice communicating with said internal zone is large than the substantial gas passage area of said orifice.

4. A baffle for an internal combustion engine wherein a compression chamber is provided, comprising an end wall with a surrounding side wall and a compression member movably disposed in relation to said walls and adapted to cooperate therewith to form such compression chamber within which a fuel and combustion-supporting gaseous medium introduced into said compression chamber can be compressed by moving said member to reduce the volume and a thrust pressure resulting from combustion of said fuel applied to said member, wherein said baffle is securable within said chamber to a wall thereof, said baffle comprising a funnel-shaped member having an orifice adjacent the wall to which it is secured and an enlarged opening substantially opposed to said orifice, and said baffle is positioned within said chamber and secured in fixed relation to said wall thereof in a manner to guide the flow of combustion product toward said enlarged opening over an external surface of said funnel-shaped member from said orifice area.

5. A baffle for continuous flow combustion equipment of the type wherein a can-type sectional shape combustion chamber is provided, said combustion equipment including an intake port feeding higher than atmospheric pressure combustion-supporting gaseous medium from one end of said combustion chamber, a fuel injection port spraying fuel into said chamber adjacent to said intake port, an ignition device igniting a mixture of said fuel and said combustion supporting gaseous medium in said chamber and a nozzle ejecting combustion product from a portion separate from said intake port to the outside; said baffle being securable within said chamber to a wall thereof, said baffle comprising a section of funnel-shape having an orifice adjacent said intake port and an enlarged opening substantially opposed to said orifice, said ignition device being located between an external surface of said baffle and said wall in said combustion chamber, said mixture being ignited by said ignition device and combustion product and uncombusted mixture being moved from said external surface to an inside space formed within the internal surface for combustion, and combustion product resulting from such combustion ejecting from said nozzle to outside.

6. In an ignition device wherein an elongated electrode is surrounded by an electrically conductive outer shell with an insulating core interposed between said electrode and said outer shell, and one end of said electrode is exposed from said insulating core, the combination therewith of a truncated cone member with an orifice at the apex thereof positioned in proximity to and longitudinally spaced from said exposed electrode and said orifice delimiting an internal zone surrounding said exposed electrode between an end portion of said member including said orifice and an end portion of said insulating core, a part of the surface of said member comprising a material which ingredient differs from said outer shell.

7. In an ingition device wherein an elongated electrode is surrounded by an electrically conductive outer shell with an insulating core interposed between said electrode and said outer shell, and one end of said electrode is exposed from said insulating core, the combination therewith of a truncated cone member with an orifice at the apex thereof positioned in proximity to and longitudinally spaced from said exposed electrode, said orifice delimiting an internal zone surrounding said exposed electrode between an end portion of said member including said orifice and an end portion of said insulating core, and in which an indication is provided for recognizing a direction of the opening communicating with said internal zone from outside of said combustion chamber when said ignition device is located at a combustion chamber.

8. A combustion apparatus for an internal combustion engine having a combustion chamber comprising an end wall and a depending side wall forming a partly enclosed combustion chamber and a compression member retractably disposed in relation to said walls to close said chamber in variable volumetric capacity, one of said walls being provided with means for admitting fuel and a gaseous medium adapted to support combustion, a predetermined igniting zone being provided in said chamber, said apparatus comprising guide means disposed within said chamber to influence the flow of gaseous medium within said zone, said guide means comprising a funnel-shaped member having a small opening facing said igniting zone and an opening of increased dimension opposed thereto, a first passage enclosed by said guide means, said guide means being disposed to form a second passage in cooperation with a wall of said chamber, gaseous medium within said chamber being conveyable into said zone through said first and second passages during a compression cycle caused by movement of said compression member, combustion product resulting from ignition and combustion in said zone causing flow through said second passage during a combustion cycle, and a projection restraining the flow of said combustion product is provided substantially on said wall.

9. A combustion chamber device for an internal combustion engine wherein a compression chamber is provided, said engine comprising an end wall with a surrounding side wall and a compression member movably disposed in relation to said walls and adapted to cooperate therewith to form such compression chamber within which a combustion-supporting gaseous medium introduced into said compression chamber can be compressed by moving said member to reduce the volume and a thrust pressure resulting from combustion of fuel introduced into said compression chamber applied to said member, said device comprising a baffle being substantially securable within said chamber to a wall thereof, said baffle comprising a funnel-shaped member having an orifice adjacent the wall to which it is secured and an enlarged opening substantially opposed to said orifice, and said baffle being positioned within said chamber and secured in fixed relation to said wall thereof in a manner to guide the flow of combustion product toward said enlarged opening over an external surface of said funnel-shaped from said orifice area, and a part of said substantially secured wall around said baffle is provided with a material which melting point is higher than the material comprising said substantially secured wall.

10. A baffle for an internal combustion engine wherein a compression chamber is provided, comprising an end wall with a surrounding side wall and a compression member movably disposed in relation to said walls and adapted to cooperate therewith to form such compression chamber within which a combustion-supporting gaseous medium introduced into said compression chamber can be compressed by moving said member to reduce the volume and a thrust pressure resulting from combustion of fuel introduced into said compression chamber applied to said member, said baffle being substantially positioned within said chamber and comprising a funnel-shaped member having an orifice facing said end wall and an enlarged opening substantially opposed to said orifice, said baffle being secured in fixed relation to said end wall thereof in a manner to guide the flow of combustion product toward said enlarged opening over an external surface of said funnel-shaped member from said orifice.

11. The baffle of claim 10 wherein said baffle is exposed to a combustion-supporting gaseous medium introduced from an intake port.

12. The baffle of claim 10 wherein said baffle is exposed to a fuel introduced into the compression chamber.

13. In an improved ignition device for an internal combustion engine wherein an outer shell and a center electrode having one end connectable with an electrical source and the extremity of another end provided as an electrode for spark discharge located at a center thereof, an insulating core surrounding said center electrode and disposed within said outer shell, said ignition device comprising a flared baffle combined with said outer shell extending in a direction of a front end of said ignition device with at least opening being defined between said baffle and said outer shell, said baffle having an orifice positioned in proximity to said extremity of the center electrode and an opening of increased dimension opposed thereto, wherein the direction of said at least one opening being defined between said baffle and said outer shell is determined by an indication on said internal combustion engine.

14. In an ignition device for a combustion device wherein an outer shell and a center electrode having one end connectable with electrical source and the extremity of another end provided as an electrode for spark discharge located at a center thereof, an insulating core surrounding said center electrode and disposed within said outer shell, said ignition device comprising a flared baffle combined with said outer shell extending in a direction of a front end of said ignition device with at least one opening being defined between said baffle and said outer shell, said baffle having an orifice positioned in proximity to said extremity of the center electrode and an opening of increased dimension opposed thereto, in which an area of said orifice is smaller than a peripheral flow space defined between said baffle and said outer shell and a spark gap is located at a portion as the flame produced by ignition flows from said peripheral flow space.

15. An ignition device according to claim 14, wherein said orifice is longitudinally spaced from the center electrode.

16. An ignition device according to claim 14, wherein said opening area of said ejection port is at least four times said area of said orifice.

17. An ignition device according to claim 14, wherein said opening area of said ejection port is greater than 33% of a surface area of a virtual cylindrical surface derived using an outer diameter of said enlarged opening of said cone and a height of said cone.

18. The combustion device according to claim 17, wherein said opening area of said ejection port is 65% of said surface area of said virtual cylindrical surface.

19. An ignition device according to claim 14, wherein said flared baffle is a truncated cone.

20. An ignition device according to claim 14, wherein said flared baffle is of heat resistant material.

21. An ignition method for an internal combustion engine comprising increasing the pressure of the gaseous medium locally at a igniting zone in a combustion chamber in accordance with flow of the gaseous medium during a compression cycle, igniting the gaseous medium in said zone in said combustion chamber, and exploding the flame resulting from ignition so as to envelope uncombusted gaseous medium in a remainder of the combustion chamber.

22. The ignition method according to claim 21, further comprising locating said ignition zone such that said uncombusted gaseous medium is positioned between said zone and a top surface of a piston.

23. The ignition method according to claim 21, further comprising cycling any of said uncombusted gaseous medium which is only partly enveloped by said flame back into said zone and completing combustion.

24. The ignition method according to claim 21, further comprising ejecting said flame radially from said zone sweeping walls of said combustion chamber.

25. In an improved ignition device for an internal combustion engine wherein an outer shell and a center electrode having one end connectable with an electrical source and the extremity of another end provided as an electrode for spark discharge located at a center thereof, an insulating core surrounding said center electrode and disposed within said outer shell, said ignition device comprising a flared baffle combined with said outer shell extending in a direction of a front end of said ignition device with at least opening being defined between said baffle and said outer shell, said baffle having an orifice positioned in proximity to said extremity of the center electrode and an opening of increased dimension opposed thereto, in which an area of said orifice is smaller than a peripheral flow space defined between said baffle and said outer shell, wherein an indication is provided for recognizing a direction of said peripheral flow space from outside of said internal combustion engine when said ignition device is combined with said internal combustion engine.

26. A combustion device for an internal combustion engine, said device comprising a funnel-shaped cone provided at a front end of a spark plug of the internal combustion engine with a specific distance and an enlarged opening facing to a piston of the engine and having an orifice, at least one ejection port being defined between an external surface of said cone and the front end of the spark plug, said port having an opening area substantially larger then an area of said orifice, wherein an igniting position by spark is determined around the orifice of said cone, and a tangent line of said external surface of said cone intersects at least a part of the top surface of the piston around its upper dead point.

27. The combustion device according to claim 26, wherein said tangent line is at an opening angle of about 45° with respect to a centerline of said cone.

28. The combustion device according to claim 26, wherein said orifice has a diameter of about 3-5 mm.

29. The combustion device according to claim 26, wherein the external surface has a high-temperature resistant coating.

30. The combustion device according to claim 26, wherein said orifice is circular.

31. The combustion device according to claim 26, wherein said orifice is cruciform.

32. The combustion device according to claim 26, wherein said opening area of said ejection port is at least four times said area of said orifice.

33. The combustion device according to claim 26, wherein said opening area of said ejection port is greater than 33% of a surface area of a virtual cylindrical surface derived using an outer diameter of said enlarged opening of said cone and a height of said cone.

34. The combustion device according to claim 33, wherein said opening area of said ejection port is 65% of said surface area of said virtual cylindrical surface.

* * * * *

UNITED STATES PATENT AND TRADEMARK OFFICE
CERTIFICATE OF CORRECTION

PATENT NO. : 4,974,559

DATED : December 4, 1990

INVENTOR(S) : Tadashi NAGAOKA

Page 1 of 3

It is certified that error appears in the above-identified patent and that said Letters Patent is hereby corrected as shown below:

Column 6, line 22, delete ". With", and insert therefor -- with --;

line 22, delete ", the", and insert therefor -- . The --.

Column 7, line 36, after "9", insert -- , --;

line 36, delete ",".

Column 19, line 6, after funnel-shaped, insert -- member --;

line 45, after "least", insert -- one --.

Column 20, line 7, delete "ejection port", and insert therefor -- peripheral flow space --;

line 10, delete "ejection port", and insert therefor -- peripheral flow space --;

line 12, delete "enlarged";

UNITED STATES PATENT AND TRADEMARK OFFICE
CERTIFICATE OF CORRECTION

PATENT NO. : 4,974,559

DATED : December 4, 1990

INVENTOR(S) : Tadashi NAGAOKA

It is certified that error appears in the above-identified patent and that said Letters Patent is hereby corrected as shown below:

Column 20, line 13, after "ing", insert -- of increased dimension --;

line 13, delete "cone", both occurrences, and insert therefor -- baffle --, both occurrences;

line 14, delete "The combustion device", and insert therefor -- An ignition device --;

line 15, delete "ejection port", and insert therefor -- peripheral flow space --;

line 23, delete "a igniting", and insert therefor -- an ignition --;

line 50, after "least", insert -- one --.

UNITED STATES PATENT AND TRADEMARK OFFICE
CERTIFICATE OF CORRECTION

PATENT NO. : 4,974,559

DATED : December 4, 1990

INVENTOR(S) : Tadashi Nagaoka

It is certified that error appears in the above-identified patent and that said Letters Patent is hereby corrected as shown below:

Column 21, line 1, delete "then", and insert therefor -- than --;

line 15, delete "the", and insert therefor -- said --.

Signed and Sealed this

Twelfth Day of January, 1993

Attest:

DOUGLAS B. COMER

*Attesting Officer*   Acting Commissioner of Patents and Trademarks